(12) United States Patent
Drillman et al.

(10) Patent No.: US 11,927,545 B1
(45) Date of Patent: Mar. 12, 2024

(54) SEMICONDUCTOR EDGE AND BEVEL INSPECTION TOOL SYSTEM

(71) Applicant: CAMTEK LTD, Migdal Ha'emek (IL)

(72) Inventors: Carmel Yehuda Drillman, Haifa (IL); Mordi Dahan, Kiryat Bialik (IL); Moshe Edri, Kiryat Tivon (IL); Ohad Shimon, Ramat Yishai (IL); Shimon Koren, Haifa (IL)

(73) Assignee: CAMTEK LTD, Migdal Ha'emek (IL)

( * ) Notice: Subject to any disclaimer, the term of this patent is extended or adjusted under 35 U.S.C. 154(b) by 0 days.

(21) Appl. No.: 18/220,972

(22) Filed: Jul. 12, 2023

Related U.S. Application Data

(60) Provisional application No. 63/479,664, filed on Jan. 12, 2023.

(51) Int. Cl.
  *G01N 21/95* (2006.01)
(52) U.S. Cl.
  CPC ..... *G01N 21/9505* (2013.01); *G01N 21/9503* (2013.01); *G01N 2201/061* (2013.01)
(58) Field of Classification Search
  CPC ........... G01N 21/9505; G01N 21/9503; G01N 2201/061
  See application file for complete search history.

(56) References Cited

U.S. PATENT DOCUMENTS

| | | |
|---|---|---|
| 1,943,510 A | 1/1934 | Walter et al. |
| 6,633,375 B1 | 10/2003 | Veith et al. |
| 7,059,778 B2 | 6/2006 | Suzuki et al. |
| 7,508,504 B2 | 3/2009 | Jin et al. |
| 2004/0056216 A1 | 3/2004 | Inenaga et al. |
| 2009/0195866 A1 | 8/2009 | Kawaski et al. |
| 2010/0134615 A1 | 6/2010 | Akamatsu et al. |
| 2013/0120557 A1 | 5/2013 | King et al. |
| 2017/0329122 A1 | 11/2017 | Osawa |
| 2019/0250108 A1 | 8/2019 | Sachs et al. |

FOREIGN PATENT DOCUMENTS

| | | |
|---|---|---|
| EP | 4033226 A1 | 7/2022 |
| JP | 2000046743 A2 | 6/2023 |
| JP | 2011022504 A2 | 6/2023 |

*Primary Examiner* — Tarifur R Chowdhury
*Assistant Examiner* — Amanda Merlino
(74) *Attorney, Agent, or Firm* — CANTOR COLBURN LLP

(57) ABSTRACT

The present disclosure relates to a novel semiconductor edge and bevel inspection tool system of a wafer comprising a first illumination setup, an imaging sensor unit, and a second illumination setup. At least a portion of the second illumination radiation is configured for interacting with at least a portion of the wafer edge and bevel region surface. The second illumination setup has different radiation parameters than the first illumination setup. The first and the second illumination radiations have substantially opposite directions.

25 Claims, 15 Drawing Sheets

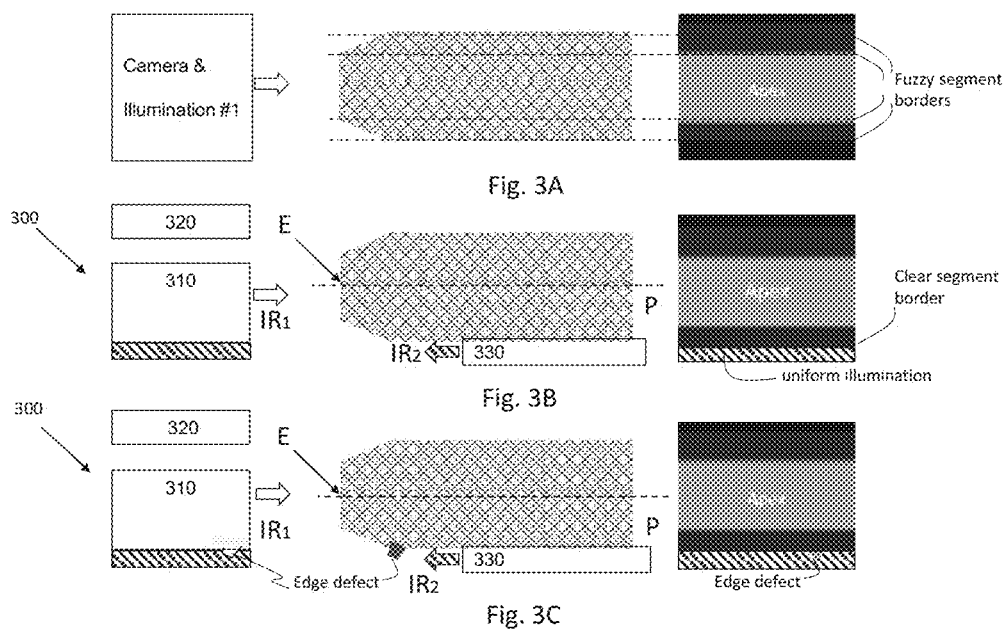

SEMICONDUCTOR EDGE AND BEVEL INSPECTION TOOL SYSTEM

CROSS-REFERENCE TO RELATED APPLICATION

This Patent application claims priority from U.S. Provisional Patent Application No. 63/479,664 filed on 12 Jan. 2023, which is incorporated herein by reference in its entirety.

TECHNOLOGICAL FIELD

The present disclosure relates generally to a wafer inspection process. More specifically, the present disclosure relates to a semiconductor inspection tool system and method for inspecting semiconductor components.

BACKGROUND

Inspection of the Edge & Bevel (E&B) is a common process step in wafer manufacturing. E&B inspection includes the wafer edge surface, being the outwards radially facing edge, as well as the rims of the top and bottom wafer (product) surfaces, also referred to as bevels.

The E&B inspection provides insights with respect to the wafer/product state, as well as to the manufacturing process. In manufacturing, it can provide data that is indicative of process stability. It can also be used in process development phases, after each stage of the manufacturing processes being developed.

In some cases, data obtained in the inspection of the E&B can be used to decide whether to continue the inspection process and/or the manufacturing process. In some cases, data obtained in the E&B inspection can be integrated with top or bottom side inspection results, to present a more complete picture of the wafer condition.

Inspection of the Edge & Bevel (E&B) is a common process step in wafer manufacturing. E&B inspection includes the wafer edge surface, that is, the outwards radially facing edge, as well as the rims of the top and bottom wafer (product) surfaces, also referred to as bevels. The E&B inspection is sometimes conducted before other types of inspection.

The E&B inspection provides insights with respect to wafer/product state, as well as to the manufacturing process. In manufacturing it can provide data that is indicative of process stability. It is also used in process development phases, after each stage of the manufacturing processes being developed.

Inspection of the "line" or area at the intersection of zones being located at the top surface of a wafer defining flat and bevel surfaces, and of zones being located at the bottom surface of the wafer defining flat and bevel surfaces is challenging and critical. The shape of that area is characterized by rounded edges e.g. the wafer edges can be beveled and rounded during the edges grinding process and or can be deformed during the bevel etch process. Those areas are challenging to inspect because most of the light reflected from these areas, from front-side illumination, does not get collected by the imaging channel, resulting in a fuzzy image of the wafer edge.

GENERAL DESCRIPTION

As described above, data obtained in the inspection of the E&B includes in particular the wafer edge defining a small band area that needs to be inspected while the wafer is rotating. An image sensor collects most of the light reflected from these areas and the image data is analyzed by a processing unit. Image analysis requires precise segmentation of the regions of interest (ROI) to determine the exact wafer geometrical dimensions, defect location, and classification. Using a conventional front-side illumination, the image obtained on the sensor of the intersection area of zones being located at the bottom surface of the wafer defining flat and bevel surfaces (as well as zones being located at the top surface of a wafer defining flat and bevel surfaces), is unclear and suffers from lack of reflected light. A precise segmentation of the wafer plane (bottom or top) from the environment (air) cannot be obtained because of the lack of reflected light. Moreover, particle defect detection and identification in this area are compromised due to image blurriness.

The present disclosure provides a novel semiconductor edge and bevel inspection tool system of a wafer comprising a first illumination setup being capable of facing a wafer edge and being configured and operable to generate a first illumination radiation along a first illumination axis and to direct at least a portion of the first illumination radiation towards an edge and bevel region of the wafer; an imaging sensor unit defining a collection optical axis being configured and operable to collect light radiation and to generate sensing data thereof; and a second illumination setup being configured to be capable of being placed facing the imaging sensor unit and being configured and operable to generate a second illumination radiation and to direct at least a portion of the second illumination radiation in a direction substantially parallel to the wafer plane toward the imaging sensor, wherein at least a portion of the second illumination radiation is configured for interacting with at least a portion of the wafer edge and bevel region surface, wherein the second illumination setup has different radiation parameters than the first illumination setup; and wherein the first and the second illumination radiations have substantially opposite directions. The term "facing a wafer edge" or "facing an imaging sensor unit" refers to a configuration in which the last component in the illumination path of the illumination setup (first and/or second) is positioned upstream to the wafer edge or the imaging sensor unit respectively in a particular direction to face and direct the illumination towards the wafer edge or the imaging sensor unit respectively. The last component in the illumination path may be one of an "illumination source" or an "optical guiding unit." The term "substantially opposite" refers hereinafter to an approximate opposite location of the first and the second illumination setups. The respective directions of each position can define an angle of less than 5, 10 or 15 degrees. The second illumination setup facing the imaging sensor unit is configured for generating light rays intersecting with the wafer plane (bottom or top). In other words, the second illumination setup provides a substantially horizontal apex facing illumination. The imaging sensor is configured to collect the light rays reflected from the wafer edge and bevel region by the first illumination setup, as well as a second illumination radiation i.e. the light rays from the second illumination setup, which are directed at the sensor unit such that the sensing data is indicative of a boundary between the wafer plane and that of the edge and bevel.

The term "wafer" refers hereinafter to any substrate (i.e. base material) made of silicon, glass, or any other semiconductor material such as Silicon carbide, Gallium nitride, germanium, gallium arsenide, silver (Ag), gold (Au), aluminum (Al), copper (Cu), tantalum (Ta), tin (Sn), tungsten (W), Palladium (Pd), aluminum nitride, aluminum phosphide, aluminum antimonide, and aluminum arsenide. In an embodiment, the wafer is made or coated with "mold compounds' or encapsulant material. Polymeric-based materials may be used to provide mechanical and environmental protection of a semiconductor device. The wafer, when viewed from above, can be round, elliptical, square, hectogon, or may have any other geometrical shape. The substrate edge can be trimmed, polished, or treated in any other manner. The wafer's top surface may include one or more patterned layers or may be bare. The wafer may further include at least a portion of an integrated circuit, a thin-film head die, a micro-electro-mechanical system (MEMS) device, flat panel displays, magnetic heads, magnetic and optical storage media, other components that may include photonics and optoelectronic devices such as lasers, waveguides and other passive components processed on wafers, print heads, and bio-chip devices processed on wafers.

In some embodiments, the first illumination setup is capable of facing a multi-tier stack edge and is configured and operable to generate a first illumination radiation along a first illumination axis and to direct at least a portion of the first illumination radiation towards an edge and bevel region of the multi-tier stack. The second illumination setup may be configured and operable to generate a second illumination radiation along a second illumination axis and to direct at least a portion of the second illumination radiation in a direction substantially parallel to the multi-tier stack plane toward the imaging sensor. At least a portion of the second illumination radiation is configured for interacting with at least a portion of the multi-tier edge and bevel region surface. The multi-tier edge and bevel region surface may be the top plane of the multi-tier stack or the bottom plane of the multi-tier stack. The imaging sensor unit is configured and operable to collect a second illumination radiation directed towards the imaging sensor unit by the second illumination setup, as well as a reflected illumination radiation reflected from the multi-tier edge and bevel region, such that the sensing data is indicative of a boundary between the multi-tier plane and that of the edge and bevel.

The term "multi-tier stack" or "stack" refers hereinafter to any possible configuration including more than one tier (e.g., two, three, four or five tier), such as a two-tier stack that includes a bottom tier and a top tier. A tier can be a wafer, a carrier, a bonding layer, a resin layer, coating or the like. The multi-tier stack may include two tiers being connected by a bonding material (e.g. resin) layer. Each tier does not have any limited thickness and may for example have a thickness of less than 10, 100, 500, 1,000, 5,000 or 10,000 microns. The multi-tier stack does not have any limited thickness and may for example have a thickness less than 10, 100, 500, 1,000, 5,000, 10,000 or 50,000 microns. The term "multi-tier plane" refers hereinafter to the bottom or top planes of the multi-tier stack. The terms "edge and bevel region of the multi-tier stack" or "multi-tier edge and bevel region" can be used interchangeably and refer hereinafter to the non-flat part of the tiers.

A typical stack (i.e., multi-stack) configuration as shown further below in FIG. 8, includes multiple wafer tiers—with a layer of bonding material in between. In some cases, a wafer is a carrier. In some cases, the bonding layer is a glue, a resin, or a material that holds the stack tiers physically connected. A typical stack configuration has, thus, more than one edge and more than one bevel, or more than one pair of bevels. The edge and bevel of the wafer stack define a bonding region volume. The term "bonding region" or "bonding region volume" refers hereinafter to a section of the stack that includes a bonding layer and the top and bottom surfaces of the wafers interfacing with the bonding layer including filled and non-filled volumes. The bonding interface/region volume includes an interstitial space between every two wafers of the stack, and an external region between the bevels of each two wafers of the stack. In other words, the term "bonding interface volume" refers hereinafter to the volume defined between two wafers of a multi-tier stack forming an interstitial space from the outer diameter (i.e. distal end) of the bonding material to the edge and bevels of the wafers of the multi-tier stack (i.e. the closest distal end of either of the top or bottom wafer, as seen in the cross-section view). The term "edge" or "bevels" refers hereinafter to the non-flat part of the tier(s). The term "edge" also applies to the bonding layer distal aspects when the term "bonding layer" refers to any filler layer separating wafers in a stack. In some embodiments, the depth-to-thickness-ratio of the interstitial space is less than 0.1, 02, 0.5, 0.6, 0.7, 0.8, 0.9, 1.0, 2.0, 3.0, 5.0, 10.0, 15.0, 20.0, 30.0, 100.0. In an embodiment, the bonding region inspection can enable measuring debris' size (e.g. less than 1, 2, 3, 4, 5, 6, 7, 8, 9, 10, 20, 30, 50, 75, 100, 200, 350, 500, 750, 1000 µm) and estimating surface roughness. The term "sensing data" refers hereinafter to any information that was reflected and collected from the surfaces of the tier, e.g., wafers and layers. In the case of an imaging sensor, the sensing data is an image. If the imaging sensor is a line camera, the sensing data is a line image, if the imaging sensor is an area camera, the sensing data is an image area. In the case of a fluorescence detector, the sensing data is a fluorescent image. The sensing data includes triangulation data, leading to height and thickness measurements. The term "thickness" as used hereinafter is interchangeably with the term "height" and refers to a dimension being measured from a side view, e.g., with optical means. During data processing patterns, abnormalities and metrology parameters can be identified. In an embodiment, sensing data includes data being indicative of at least one of the 2D geometrical dimensions, 3D geometrical dimensions, and surface characteristics such as color, roughness, and continuity. The 3D data may be sensed using triangulation systems, White Light Interferometry (WLI), and/or Chromatic Confocal Sensors. The term "sensing data" also refers to any data being indicative of anomalies and variations along the edge of the wafer including geometrical dimension variations, anomalies of shape, and anomalies of reflections characteristics. The data referring to any anomaly and variations along the edge of the wafer includes but is not limited to data being related to particles (e.g., resist particles, embedded particles), debris, chips, stains, cracks, scratches, copper-overflow, delamination, blisters, corrosion, surface roughness, discoloration, or any combination thereof. In an embodiment, sensing data may be categorized as defect data. The term "defect data" refers hereinafter to any information referring to any anomaly and variations along the edge of wafer including but not limited to particles (e.g. resist particles, embedded particles), debris, material splash, chips, stains, edge cracks, scratches, copper-overflow, delamination, blisters, corrosion, surface roughness, discoloration, chipping edge and through the tape, bubbles, vacancies, resin flash or any combination thereof. Detecting sensing data enables either re-work, discontinuing processing, or process enhancement to achieve better yields. Moreover, the sensing data, as viewed from the side or top, or bottom, can be internal to the wafer, as in voids, cracks, or alignment or discoloration on the surface of the wafer or mold, or external to the wafer, as in excess glue or material residues, that jut out of the wafer diameter. External to the wafer sensing data can take many forms, from that of a string-shaped oddment, whose length is significantly longer than its width or diameter, to a flap-like shaped oddment whose length dimension extending from the wafer edge is significantly smaller than its width or thickness. In this connection, it should be noted that the discoloration is an indication of an anomaly. It is an indication of a possible event such as a material or manufacturing anomaly. In a specific and non-limiting example, the rate of discoloration can be an indication of thickness variation, contamination, and/or glue residue. In an embodiment, the rate of discoloration can be identified by thin film interference. In a specific and non-limiting example, the rate of discoloration indicates the presence of additional material with different reflectance properties. Different reflectance properties include but are not limited to wavelength, angle of incidence, intensity, and polarization. In an embodiment, metallic particles can be identified by their shape, reflectance, color, and material properties. In an embodiment, metallic particles include Au, Ag, Cu, Al, and Pd particles.

The terms "illumination radiation", "light radiation", "radiation" or "light" are hereinafter used interchangeably.

The technique of the present disclosure can be a standalone technique aimed at inspecting the wafer itself or may be combined with conventional edge and bevel inspection techniques to improve the analysis of the edge and bevel inspections. The technique of the present disclosure enables to inspect the edge and bevels regions, while the wafer stack is rotating at a speed of, for example, 10, 20, 30, 40, 50, 60, 70, 80, 90, 100, 120, 150, 180, 200, 270 or 360 deg/sec.

In some embodiments, the system may take more than one inspection pass (i.e., rotation) i.e., the wafer (stack) may be rotated multiple times. In different passes, the exposure rate and or other exposure parameters may be varied. At each rotation, i.e., inspection pass, the exposure rates may differ.

The edge and bevels inspection system (i.e. the measurement module) may include at least one of a non-imaging scatterometer, a scatterometer, a spectroscopic scatterometer, a reflectometer, a spectroscopic reflectometer, an ellipsometer, a spectroscopic ellipsometer, a bright field imaging module, a dark field imaging module, a bright field non-imaging module, a dark field non-imaging module, a coherence probe microscope, an interference microscope, an optical profilometer, or any combination thereof.

In some embodiments, the different radiation parameters comprise (i) spectral properties including at least one of intensity, wavelength, or angular coverage, (ii) illumination duration, or (iii) operation modes. In particular, the two illumination setups may operate at the same time—e.g., a digital voltage controller enables triggering the illuminations channels, in a synchronized manner. In some embodiments, the two illumination setups may operate simultaneously in order to maximize the number of reflected photons. Additionally or alternatively, the two illumination setups have different spectral properties.

In some embodiments, the imaging sensor unit is positioned at a sensing plane defining a certain non-zero angle relatively to a wafer edge plane. The imaging sensor unit may be positioned substantially perpendicularly relatively to a wafer edge plane. In particular, the imaging sensor unit may be positioned at a horizontal distance with respect to an edge of the wafer being smaller than the wafer diameter.

In some embodiments, the different radiation parameters comprise (i) spectral properties including at least one of intensity, wavelength or angular coverage, (ii) illumination duration (iii) operation modes, or (iv) illumination beam shape and properties. The dimension of the illumination beam is not limited, however, to be effective the diameter of the illumination beam should not exceed 10, 20, 50, 75, 100, 250, 500, 750, or 1000 µm. A beam shaper may also be used to create a spot whose shape is round or ellipsoidal, a line or rectangle, substantially triangular, or any other illumination beam having a shape corresponding to the bonding region.

In some embodiments, at least one of the following: the collection optical axis, the first or the second illumination axis do not intersect with the wafer center.

In some embodiments, the inspection system further comprises a third illumination setup being configured to be capable of being placed facing said imaging sensor unit and being configured and operable to generate a third illumination radiation and to direct at least a portion of the third illumination radiation in a direction substantially parallel to the wafer plane toward the imaging sensor, wherein at least a portion of the third illumination radiation is configured for interacting with at least a portion of the wafer edge and bevel region surface. The third illumination setup may be positioned on a plane different from the plane on which the second illumination setup is positioned. The second illumination setup and/or the third illumination setup are configured and operable to detect edge defects. The second illumination setup and/or the third illumination setup are configured and operable to detect wafer top surface defects.

In some embodiments, the last component of the third illumination setup (i.e. an illumination source or an optical guiding unit) is positioned beyond the wafer circumference substantially facing the imaging sensor unit. In some embodiments, the first illumination setup is positioned in close proximity to the imaging sensor unit. The first illumination setup may have an arc-shaped configuration being capable of generating an omnidirectional illumination radiation around a wafer edge. The first illumination setup may comprise at least one light source defining a certain intensity. The first illumination setup intensity is defined by all of the light sources within it. The intensity of the first illumination setup may be higher than the intensity defined by the second illumination setup or by the third illumination setup. The inspection tool system may include a fluorescent light source.

In some embodiments, the second illumination setup is positioned in close proximity to the wafer edge. The second illumination setup may be configured to be placed below the wafer plane. The second illumination setup may be configured and operable to generate a substantially collimated illumination radiation. In particular, the second illumination setup is configured and operable to generate collimated or near-collimated illumination directed at the sensor unit. The second illumination setup may comprise a collimated light source, with zero divergence (or near zero divergence) being capable of emitting a beam of light in which all the rays are substantially parallel. The collimated illumination enables to provide a sharp edge detection.

In some embodiments, the second illumination radiation parameters comprise at least one of, focusing, beam size, power, polarization, or direction. The second illumination radiation parameters may comprise beam propagation parameters comprising at least one of, collimation, convergence, or divergence.

In some embodiments, the second illumination setup and/or the third illumination setup includes a light source having a narrowband spectrum (e.g. having wavelength within the range of about 450 to about 650 nanometers). In some embodiments, the second illumination setup and/or the third illumination setup may include a solid-state light (SSL)

of any visible or near visible wavelength. In particular, the second illumination setup may include a green LED.

In some embodiments, the second illumination setup and/or the third illumination setup comprises an optical guiding unit being configured to be positioned in close proximity to the wafer plane and being configured and operable to direct at least a portion of at least one of the second illumination radiation or the third illumination radiation toward the imaging sensor, such that at least a portion of the second illumination radiation or the third illumination radiation is configured for interacting with at least a portion of the wafer edge and bevel region surface. The optical guiding unit may be configured and operable to direct at least a portion of at least one of the second illumination radiation or the third illumination radiation in a direction substantially parallel to the wafer plane. The optical guiding unit may be configured and operable to direct at least one of the second illumination radiation or the third illumination radiation at a certain non-zero angle relatively to the wafer plane. The optical guiding unit may comprise at least one prism element, a mirror, or a light pipe.

When the second illumination setup is positioned below the wafer plane, the third illumination setup may be positioned above the wafer plane. The second illumination setup may be positioned at a first predefined distance from the imaging sensor unit. The third illumination setup may be positioned at a second predefined distance from the imaging sensor unit, the first predefined distance being smaller than the second predefined distance. The second predefined distance may be larger than a wafer diameter. The second illumination setup and/or third illumination setup may be configured and operable to generate a substantially collimated illumination radiation.

In some embodiments, the third illumination setup includes a light source having a narrowband spectrum. In particular, the third illumination setup may include a green SSL. Additionally or alternatively, the third illumination setup may be positioned in close proximity to the wafer edge.

In some embodiments, the third illumination setup includes an optical guiding unit being configured and operable to direct the third illumination radiation substantially parallel to the wafer plane. The optical guiding unit may be configured and operable to direct the third illumination radiation in a direction substantially parallel to the wafer plane. Alternatively, the optical guiding unit is configured and operable to direct the third illumination radiation at a certain non-zero angle relatively to the wafer plane. The optical guiding unit may comprise at least one prism element, a mirror, or a light pipe.

In some embodiments, the inspection tool system further comprises a fluorescent light source.

In some embodiments, the inspection tool system further comprises a control unit being configured and operable for controlling the operation of at least one of the first illumination setup, the second illumination setup, the third illumination setup, or the imaging sensor unit. In particular, the control unit is configured and operable to operate synchronously at least two of the first, second, and third illumination setups. The control unit may be configured and operable to operate at least partially at the same time at least two of the first, second, and third illumination setups. The control unit may be configured and operable to operate sequentially at least two of the first, second, and third illumination setups.

In some embodiments, the inspection tool system further comprises at least one mechanical unit being configured and operable to position at least one of the first, the second, or the third illumination setup. The at least one mechanical unit is configured and operable to enable the loading and unloading of the wafer.

In addition, transparent or semi-transparent materials that are being used during wafer production such as glass can be inspected to detect defects such as scratches and coating peeling/delamination. This type of defect scatters the propagated light through the transparent material and forms a distinct change in image contrast.

As used herein, the term "substantially" refers to the complete or nearly complete extent or degree of an action, characteristic, property, state, structure, item, or result.

As used herein the term "about" refers to plus or minus 10 percent.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 3A-3C show schematic cross-sectional views of a conventional system (FIG. 3A), the semiconductor edge and bevel inspection tool system of the present disclosure (FIGS. 3B-3C) illuminating a wafer and a wafer having an edge defect (FIG. 3C) and the respective captured images;

DETAILED DESCRIPTION OF EMBODIMENTS

Figure 1:
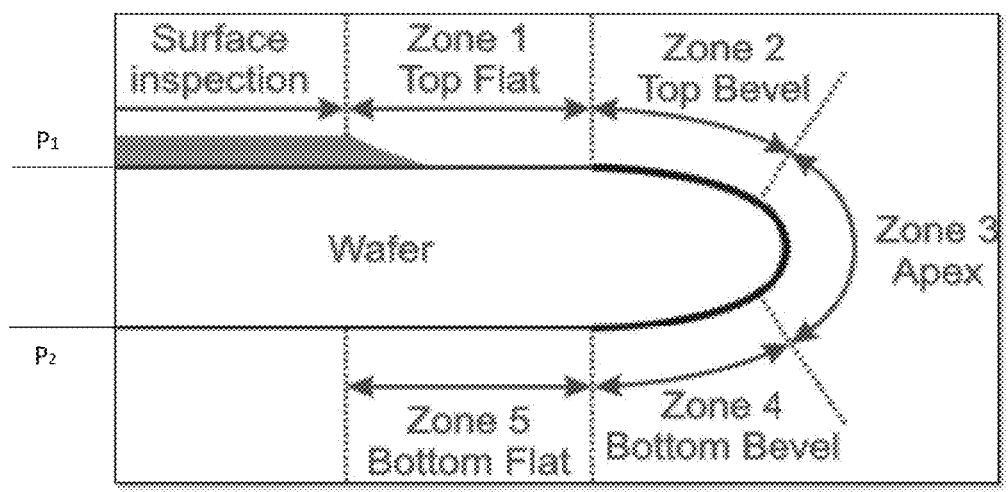
FIG. 1 shows a schematic cross-sectional view of the different zones defining the edge and bevels surfaces of a wafer.

Reference is made to FIG. 1, showing a schematic cross-sectional view of the different zones (zones 1-5) defining the edge and bevel surfaces of a wafer. The edge and bevels region defines a Zone 1 being the top flat region of the rounded edge, Zone 2 being the top bevel region of the rounded edge, Zone 3 being the apex region of the rounded edge, Zone 4 being the bottom bevel region of the rounded edge and Zone 5 being the bottom flat region of the rounded edge.

The semiconductor edge and bevel inspection tool system of the present disclosure enables to distinctly define the boundary between the wafer plane(s) (i.e. top wafer plane $P_1$ and/or bottom wafer plane $P_2$) and that of the edge and bevel, i.e., the intersection area of zones 1&2 and 4&5. The term "boundary" refers hereinafter to a transition zone separating the flat area and the bevel area, where the tangent of the bevel is more than beta degrees, beta being less than 0.1, 0.5, 1.0, 1.5, 2.0 degrees. The boundary being less fuzzy enables to identify defects/contaminations that absorbed/scattered light reveals as abnormal shading. Defects/contaminations that cause shading are detected in the imaging channel as shaded areas with sharper boundaries.

Although an unstacked wafer is illustrated in the figure, the semiconductor edge and bevel inspection tool system of the present disclosure is also capable of inspecting a multi-tier stack to distinctly define the boundary between the wafer plane(s) (i.e. top wafer plane $P_1$ and/or bottom wafer plane $P_2$) and that of the respective edge and bevel, i.e., the intersection area of zones 1&2 being the top surface of the top tier and intersection area of zones 4&5 being the bottom surface of the bottom tier. The term "multi-tier stack" or "stack" refers hereinafter to any possible configuration including more than one wafer tier (e.g. three, four or five tiers), such as a two-tier stack that includes a bottom wafer and a top wafer wherein the top wafer is mounted/bonded/glued, e.g., with a bonding layer, to the bottom wafer. The multi-tier stack does not have any limited thickness and may for example have a thickness that is less than 10, 50, 100, 500, 600, 750, 1000, 1500, 3000, 5000, 10,000, 15,000, 25,000, 50,000, 100,000, or 250,000 microns.

Figure 2:
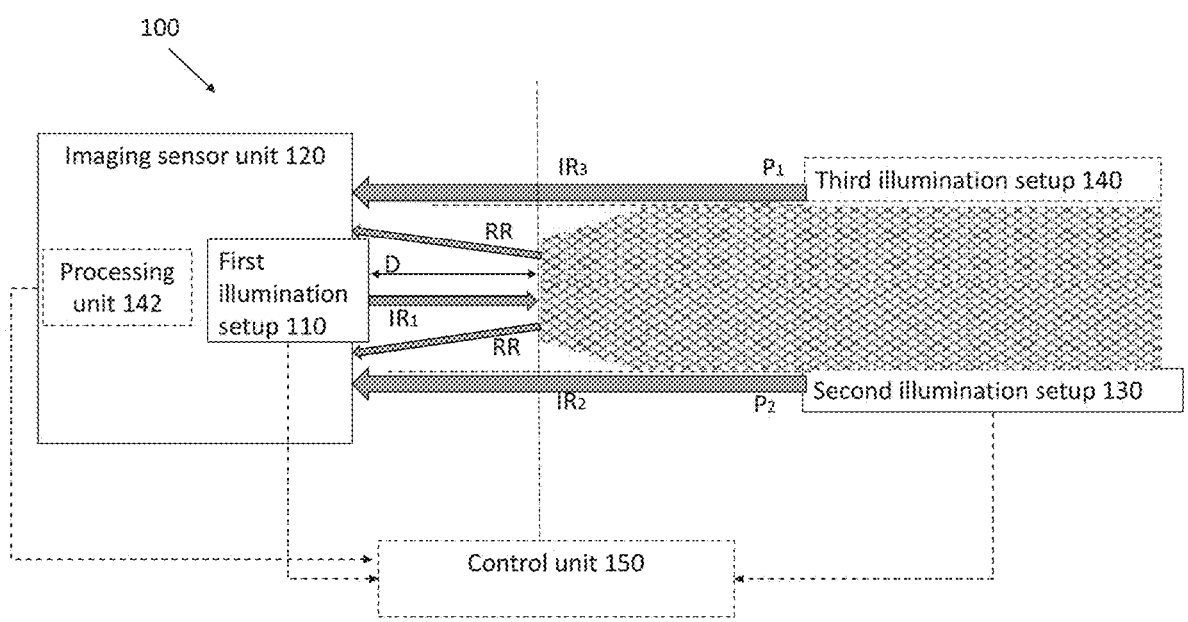
FIG. 2 is a block diagram showing the main functional parts of the semiconductor edge and bevel inspection tool system according to the teachings of the present disclosure.

Reference is made to FIG. 2, showing a schematic block diagram of the main functional parts of the semiconductor edge and bevel inspection tool system 100 according to some embodiments of the present disclosure. Elements in the figures are illustrated for simplicity and clarity and have not necessarily been drawn to scale. Semiconductor edge and bevel inspection tool system 100 comprises a first illumination setup 110 being capable of facing a wafer edge and being configured and operable to generate first illumination radiation $IR_1$ and to direct at least a portion of the first illumination radiation towards an edge and bevel region of the wafer; an imaging sensor unit 120 being configured and operable to collect light radiation and to generate sensing data; and a second illumination setup 130 being configured to be capable of being placed facing of the imaging sensor unit 120 and being configured and operable to generate second illumination radiation $IR_2$ and to direct at least a portion of the second illumination radiation $IR_2$ in a direction substantially parallel to the bottom or top wafer planes $P_1$ or $P_2$ toward the imaging sensor unit 120. In other words, second illumination setup 130 is configured and operable to direct at least a portion of the second illumination radiation $IR_2$ towards the imaging sensor unit 120 and at the wafer edge simultaneously. The first radiation $IR_1$ and the second illumination radiation $IR_2$ have substantially opposite directions. The light radiation directed towards the imaging sensor unit 120 comprises a second illumination radiation $IR_2$, as well as a reflected illumination radiation RR reflected from the wafer edge and bevel region, wherein the reflected illumination radiation is created by the first illumination setup 110.

The wafer is assumed to be in a horizontal plane being coaxial with the bottom wafer plane $P_1$ and the top wafer plane $P_2$. First illumination setup 110 is configured to be placed in front of the edge/apex of the wafer. Second illumination setup 130 can be placed coaxially with the bottom or top wafer planes $P_1$ or $P_2$ but may also define a certain non-zero angle (e.g. slightly tilting towards the wafer plane) with the bottom or top wafer planes $P_1$ or $P_2$. Imaging sensor unit 120 is positioned at a sensing plane being coaxial with the bottom or top wafer planes $P_1$ or $P_2$ but may also define a certain non-zero angle (e.g. slightly tilting towards the wafer plane) with the bottom or top wafer planes $P_1$ or $P_2$. In some embodiments, imaging sensor unit 120 is positioned at a horizontal distance D with respect to the edge of the wafer being smaller than the wafer diameter.

At least a portion of the second illumination radiation $IR_2$ is configured for interacting with at least a portion of the wafer edge (Zone 1 or Zone 5 of FIG. 1 above) and bevel region surface (Zone 2 or Zone 4 of FIG. 1 above). The second illumination setup 130 has different radiation parameters than the first illumination setup 110. The first illumination setup 110 may comprise a plurality of light sources. The different radiation parameters may be different spectral properties such as different intensity and/or wavelength and/or angular coverage. For example, each or all the light sources of the first illumination setup 110 may have an intensity higher than that of the second illumination setup. Additionally or alternatively, the second illumination setup has a different color to enable better segmentation and definition of boundaries. It should be understood that the second illumination setup is configured and operable to provide a high intensity illumination, which when the wafer is not present, covers a significant portion of the sensor unit. Once the wafer is positioned such that at least a portion of the light rays of the second illumination setup intersect the wafer bottom (or top) plane, a smaller portion of the sensor is covered by the light rays of the second illumination setup. The wafer edges correspond to the outline of the area that is "blinded" on the sensor. This area and boundaries are well defined. It produces a clear sharp image of the wafer edges. In an embodiment, this outline represents the wafer bottom plane. Additionally or alternatively, the different radiation parameters may be the illumination duration comprising different time magnitudes. Additionally or alternatively, the different radiation parameters may comprise different operation modes as detailed further below.

In this specific and non-limiting example, the imaging sensor unit 120 may be positioned substantially perpendicularly relative to the wafer edge plane $P_3$. As shown in the figure, the first illumination setup 110 may be positioned in close proximity to the imaging sensor unit 120. The term "close proximity" may be defined as an adjacent location but non-contacting. The term "close proximity" in this situation, may be defined as an adjacent location but non-contacting and less than 1, 2, 3, 4, 5, 7, 10, 15, 20, 30, 50, 100, 200, 300, 500, 1,000 mm from the wafer edge/apex.

The second illumination setup is configured to be placed below the wafer plane $P_2$ as illustrated in the figure. The second illumination setup 130 is positioned in close proximity to the wafer edge. For example, second illumination setup 130 is positioned less than 1, 2, 3, 4, 5, 7, 10, 15, 20, 30, 50, 100 mm from the wafer edge/apex.

The first illumination setup 110 and/or the second illumination setup 130 can be configured and operable to generate a uniform illumination. The uniform illumination enables to obtain a homogeneous image. An artifact in the homogeneous image is indicative of defect data, such as an edge defect. In some embodiments, imaging sensor unit 120 may be connected to a processing unit 142 being configured and operable for receiving, analyzing sensing data, and determining defect data.

In some embodiments, inspection system 100 comprises a control unit 150 being configured and operable to control the operation of each one of the elements of inspection system 100 i.e. first illumination setup 110 and/or second illumination setups 130 and/or imaging sensor 120 and/or of the synchronization between them. Second illumination setup 130 should be operated at least when imaging sensor 120 for inspection and or metrology is activated. Moreover, control unit 150 may include a digital voltage controller being capable of triggering the plurality of illuminations channels, in a synchronized manner. Control unit 150 may be configured and operable to operate the plurality of illuminations channels at least partially at the same time or sequentially.

In some embodiments, as will be described below with respect to FIG. 6, inspection system 100 may include a third illumination setup 640 being configured and operable to generate third illumination radiation $IR_3$ and to direct at least a portion of the third illumination radiation in a direction substantially parallel to the wafer plane toward the imaging sensor 120, wherein at least a portion of the third illumination radiation is configured for interacting with at least a portion of the wafer edge and bevel region surface.

Reference is made to FIGS. 3A-3C showing a schematic cross-section of a conventional inspection system using one illumination (FIG. 3A) as compared with the inspection system of the present disclosure when inspecting a regular wafer (FIG. 3B) and a wafer having an edge defect (FIG. 3C). In FIG. 3A, a wafer is inspected using a front camera and a front illumination source facing the wafer edge. In the image obtained the segment borders, e.g., the boundary between the wafer planes (Zone 1 & Zone 5 of FIG. 1) and that of the bevels (Zone 2 & Zone 4 of FIG. 1) are fuzzy. The segment borders cannot be accurately identified. FIGS. 3B-3C schematically show the main functional parts of an inspection system 300 according to the teachings of the present disclosure.

Inspection system 300 comprises (i) a first illumination setup 310 facing a wafer edge E and being configured and operable to generate first illumination radiation $IR_1$ and to direct at least a portion of the first illumination radiation towards an edge and bevel region of the wafer, (ii) an imaging sensor unit 320 being configured and operable to collect light radiation and to generate sensing data and (iii) a second illumination setup 330 facing the imaging sensor unit 320 and being configured and operable to generate second illumination radiation $IR_2$ and to direct at least a portion of the second illumination radiation $IR_2$ in a direction substantially parallel to the wafer plane P toward the imaging sensor 320. The second illumination setup 330 is configured to have at least three conditions: (i) at least a portion of the second illumination radiation $IR_2$ interacts/contacts with a portion of the wafer edge and bevel region surface, (ii) the second illumination setup 330 has radiation parameters being different than the first illumination setup, and (iii) the second illumination setup 330 is positioned to face the imaging sensor unit 320. These three conditions enable to provide sensing data being indicative of a boundary between the wafer plane and that of the edge and bevel as clearly shown in FIG. 3B. Clear segment border appears in the image collected by the imaging sensor unit 320. FIG. 3C illustrates an example in which the unique configuration of system 300 enables the detection of an edge defect according to some embodiments of the present disclosure. In this connection, it should be noted that the addition of second illumination setup 330 enables the detection of defects that cannot be detected by using first illumination setup 310 alone. As shown in the figure, the edge defect obstructs or deflects a portion of the $IR_2$ rays, such that a portion of the $IR_2$ rays do not reach the imaging sensor unit 320. The absence of these rays in the captured image is indicative of defect data, e.g., the presence of an edge defect, crack, contamination, etc. Moreover, the detectability of certain defects is increased when using multiple illumination sources with non-uniform spectral properties.

Figure 4A:
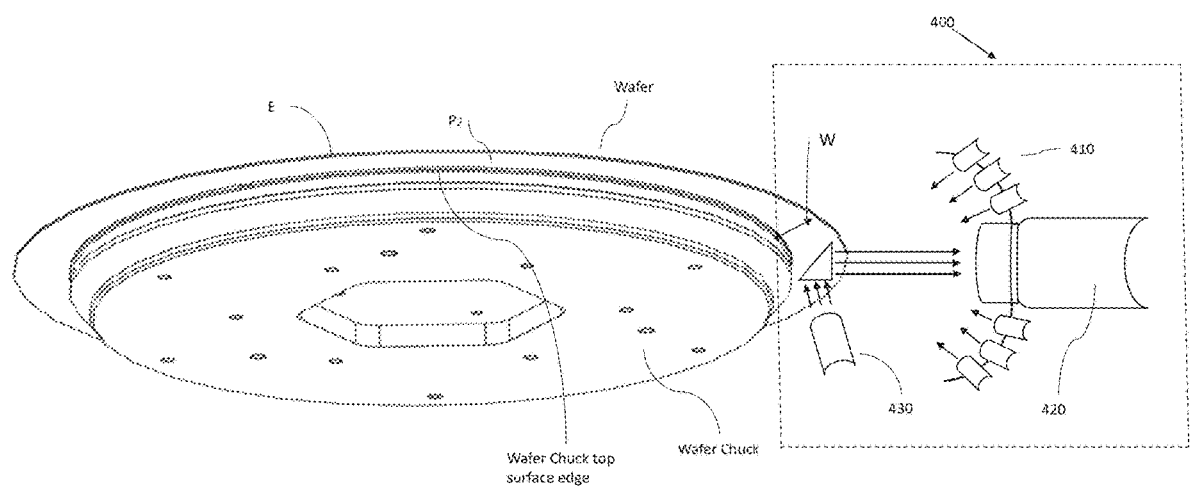
FIG. 4A shows a schematic bottom view of a semiconductor edge and bevel inspection tool system of the present disclosure.
Figure 4B:
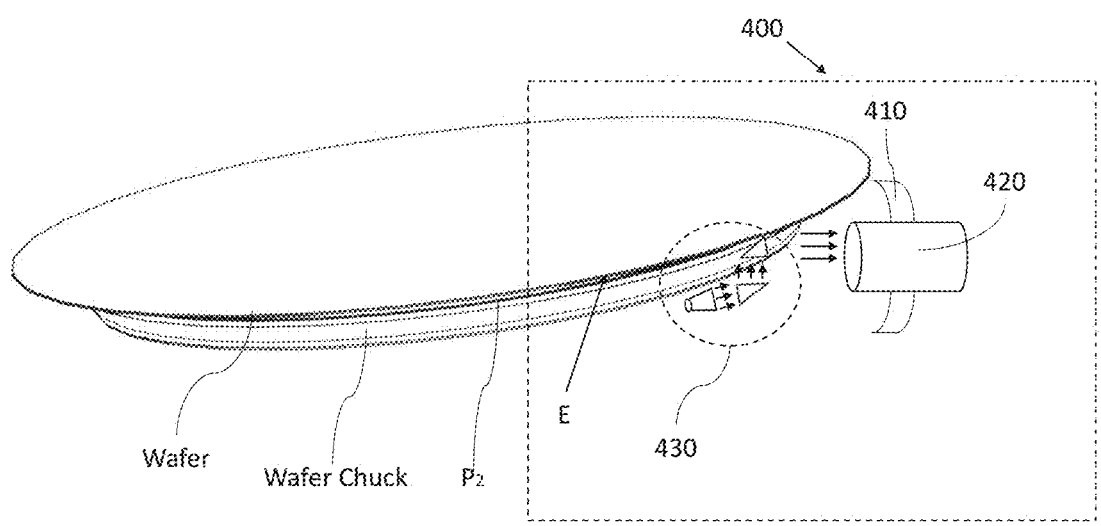
FIG. 4B shows a schematic top view of the same.
Figure 4C:
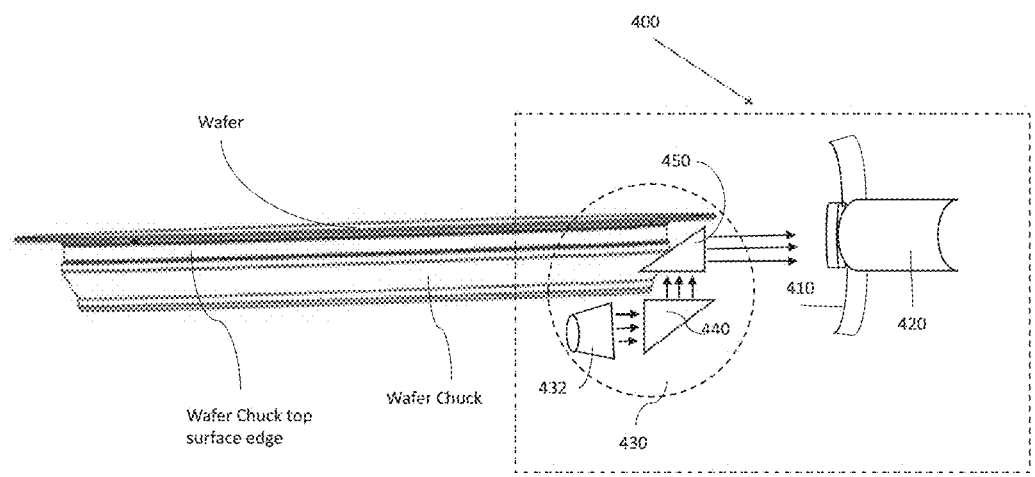
FIG. 4C shows a schematic bottom enlarged view of the same.

Reference is made to FIGS. 4A-4C showing a possible configuration of the inspection system 400 of a wafer placed on a rotating wafer chuck according to some embodiments of the present disclosure. Inspection system 400 comprises a first illumination setup 410 facing a wafer edge E and being configured and operable to generate first illumination radiation and to direct at least a portion of the first illumination radiation towards an edge and bevel region of the wafer, an imaging sensor unit 420 being configured and operable to collect light radiation and to generate sensing data and a second illumination setup 430 facing the imaging sensor unit 420 and being configured and operable to generate second illumination radiation and to direct at least a portion of the second illumination radiation in a direction substantially parallel to the wafer plane toward the imaging sensor 420. In this embodiment, first illumination setup 410 has an arc-shaped configuration surrounding the wafer edge and being capable of generating omnidirectional illumination radiation around the wafer edge.

As mentioned above, directing an illumination channel toward the imaging channel can be challenging. The available real estate for positioning a second illumination setup is very limited due to geometrical/mechanical limitations such as wafer diameter and the wafer chuck diameter as shown in the figure. The wafer chuck and a Z stage (not shown) are configured to position the wafer relative to imaging sensor 420. The diameter of the wafer supported by a wafer chuck is larger than the diameter of the wafer chuck. When viewing a supported wafer from the bottom, only a distal circular band is visible. The band is the area of the wafer that is larger than the area of the wafer chuck. Second illumination setup 430 should be configured not to interfere with other parts of the inspection system 400. One of the available parts for inserting the second illumination setup 430 without interfering with other parts of the inspection system 400 is the wafer bottom surface band defining a bottom plane area exposed wafer view from below. Second illumination setup 430 should be configured to fit this band (i.e. minimal band width area) having a certain width W. If the wafer is concentric to the wafer chuck, the width of the band is 0.5×(wafer dia.—chuck dia.). In an embodiment, the band width W is less than 1, 2, 3, 5, 7, 10, 15, 20, 25, 30 mm. In an embodiment, the band width W varies, e.g., due to centricity misalignment, by less than 10%, 20%, 30%, 40%, 50%, 60%, 70%, 80%, 90% of the max band width. In an embodiment, the band width variation is defined by the range of the measured band width. For example, if the maximal width is 20 mm and the variation is less than 20% of the max width, i.e., 4 mm, the minimum band width is 16 mm.

In some embodiments, second illumination setup 430 is configured and operable to generate a collimated beam being directed directly onto the imaging sensor surface. As described above, in some embodiments, second illumination setup 430 may be configured to have a high intensity to blind a portion of the sensor unit and a different color to enable better segmentation and definition of boundaries. To this end, second illumination setup 430 may be implemented by using a green LED facing the edge (i.e. apex) bottom surface of the wafer. The green LED enables a clear definition of the wafer edge and enables to distinct the back side of the wafer plane from the top side of the wafer, which is illuminated with different spectral properties, e.g. white light. Further, in an embodiment, an industrial color sensor is designed to be more sensitive at the near green wavelength (550 nm), enabling to collect more photons in contrast to shorter or longer wavelengths. However, this example is not limiting and the second illumination setup 430 may also comprise another light source such as a solid-state light SSL within the range of visible or near visible wavelength, for example, a solid-state light SSL with a wavelength within the range of 380 to about 750 nanometers or 310 to about 1100 nanometers.

Further, in the case of warped wafers, it is challenging to illuminate the intersection area of Zones 1&2 or 5&4 shown in FIG. 1. The optical setup and the illumination angle should be configured to overcome those issues. The light path of the second illumination setup should be manipulated to be as close as possible to the wafer plane in the band region and to the wafer edge. FIG. 4C shows an enlarged view of second illumination setup 430. In this non-limiting example, second illumination setup 430 comprises a light source 432 being configured to generate illumination radiation. Second illumination setup 430 is positioned onto the wafer chuck by using a mechanical unit 440 (e.g. a bracket) coupling between the second illumination setup 430 and the wafer chuck. A mechanical unit 440 should be configured not to interfere with the other parts of the system and should enable the loading or unloading of the wafer onto the wafer chuck without any interference. To direct at least a portion of the second illumination radiation in a direction substantially parallel to the wafer plane toward the imaging sensor 420, to enable to achieve a clearer and sharper image from the apex sensor perspective, second illumination setup 430 may include an optical guiding optical unit 450 being configured to be positioned in close proximity to the wafer plane and directs light toward the imaging sensor 420, such that at least a portion of the second illumination radiation configured for interacting with at least a portion of the wafer edge and bevel region surface. In this connection, the term "substantially parallel to the wafer plane" refers to the bottom plane of the wafer band, while the wafer is mounted on the wafer chuck. For example, it may refer to less than 1, 2, 3, 4, 5, 7, 10 degrees difference.

Optical guiding optical unit 450 is configured to change the light radiation direction. In this specific and non-limiting example, optical guiding optical unit 450 comprises a prism being configured and operable to direct at least a portion of the second illumination radiation in a direction substantially parallel to the wafer plane toward the imaging sensor 420. However, optical guiding optical unit 450 is not limited to this specific example and may comprise a mirror or a light pipe. The term "positioned in close proximity to the wafer plane" refers to the plane of the wafer, e.g., the bottom prism is flush with the wafer-chuck surface but not touching. It should be noted that the wafer rotates, while the second illumination setup 430 is mounted on a non-rotating surface.

Figure 5:
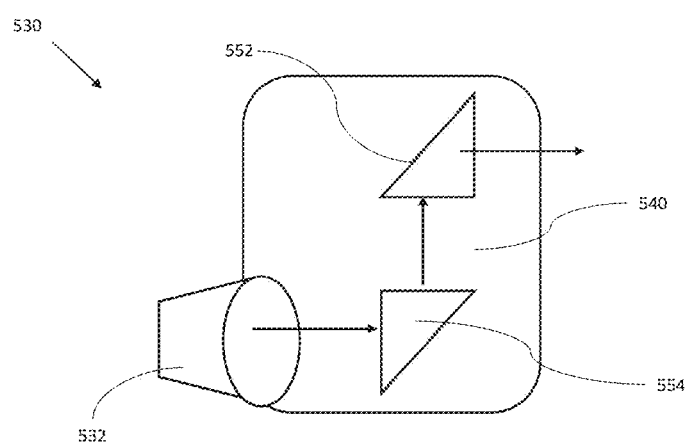
FIG. 5 shows a schematic side view of a possible configuration of a second illumination setup of an inspection system of a wafer according to some embodiments of the present disclosure.

Reference is made to FIG. 5 showing a possible configuration of a second illumination setup 530 of an inspection system of a wafer according to some embodiments of the present disclosure. Second illumination setup 530 comprises a light source 532 being configured to generate illumination radiation. Second illumination setup 530 is positioned onto the wafer chuck by using a mechanical unit 540 (e.g. a bracket) coupling between the second illumination setup 530 and the wafer chuck. To direct at least a portion of the second illumination radiation in a direction substantially parallel to the wafer plane toward the imaging sensor, second illumination setup 530 may include an optical guiding optical unit being configured to be positioned in close proximity to the wafer plane, such that at least a portion of the second illumination radiation is configured for interacting with at least a portion of the wafer edge and bevel region surface. In this specific and non-limiting example, the optical guiding optical unit comprises a first prism 554 being configured and operable to direct at least a portion of the second illumination radiation towards a second prism 552 being configured and operable to direct at least a portion of the second illumination radiation towards in a direction substantially parallel to the wafer plane toward the imaging sensor. The position of the first and second prisms 554 and 552 can be adjusted to direct the second illumination radiation at a certain non-zero angle relatively to the wafer plane.

Figure 6:
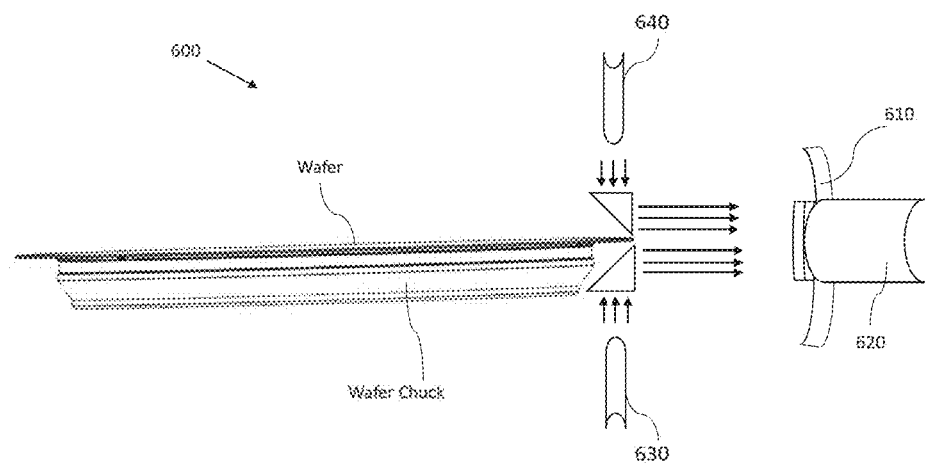
FIG. 6 shows a schematic side view of a possible configuration of the inspection system of a wafer placed on a wafer chuck according to some embodiments of the present disclosure.

Reference is made to FIG. 6 showing a possible configuration of the inspection system 600 of a wafer placed on a wafer chuck according to some embodiments of the present disclosure. Inspection system 600 comprises a first illumination setup 610 facing a wafer edge and being configured and operable to generate first illumination radiation and to direct at least a portion of the first illumination radiation towards an edge and bevel region of the wafer, an imaging sensor unit 620 being configured and operable to collect light radiation and to generate sensing data, a second illumination setup 630 facing the imaging sensor unit 620 and being configured and operable to generate second illumination radiation and to direct at least a portion of the second illumination radiation in a direction substantially parallel to the wafer plane toward the imaging sensor 620 and a third illumination setup 640 being configured and operable to generate third illumination radiation and to direct at least a portion of the third illumination radiation in a direction substantially parallel to the wafer plane toward the imaging sensor 620, wherein at least a portion of the third illumination radiation is configured for interacting with at least a portion of the wafer edge and bevel region surface. Third illumination setup 640 is positioned in close proximity to the wafer edge. As shown in the figure, the third illumination setup 640 is positioned on a plane different from the plane on which the second illumination setup 630 is positioned. In this specific and non-limiting example in which the second illumination setup 630 is positioned below the wafer plane, the third illumination setup 640 is positioned above the wafer plane. However, the third illumination setup 640 may also be positioned below the wafer plane. In this example, the second illumination setup 630 and the third illumination setup 640 are positioned such that the second illumination setup 630 and the third illumination setup 640 hovers above the top surface of the wafer and are positioned at a small angle (e.g. less than 2°, 5°, 10°, 200 30°, 45°) relatively to the wafer plane. The hovering height may be less than 1, 2, 3, 4, 5, 7, 10, 15, 20, 30, 50, 100, 250, 500, 750, 1,000 microns.

The third illumination setup 640 may be configured and operable to generate substantially collimated illumination radiation. Third illumination setup 640 may include a light source (not shown) having a narrowband spectrum (e.g. a green LED). Although not shown in the figure, third illumination setup 640 may include an optical guiding unit being configured and operable to direct the third illumination radiation substantially parallel to the wafer plane. The optical guiding unit is configured and operable to direct the third illumination radiation in a direction substantially parallel to the wafer plane or at a certain non-zero angle relatively to the wafer plane. Similarly to the optical guiding unit of the second illumination setup, the optical guiding unit may include at least one prism element, a mirror, or a light pipe.

Figure 7A:
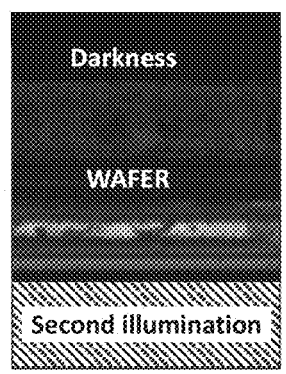
FIGS. 7A-7B show images obtained by using two different possible configurations of the inspection system according to some embodiments of the present disclosure.
Figure 7B:
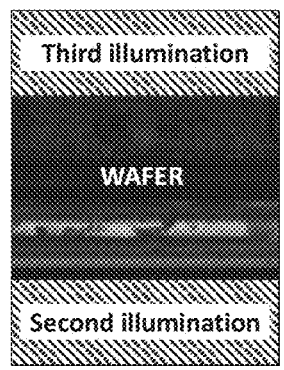

Reference is made to FIGS. 7A-7B showing images obtained by using the inspection system of the present disclosure. A clear sharp image of the wafer edges representing the wafer bottom plane is shown in FIG. 7A and the wafer bottom and top planes are shown in FIG. 7B.

Figure 8:
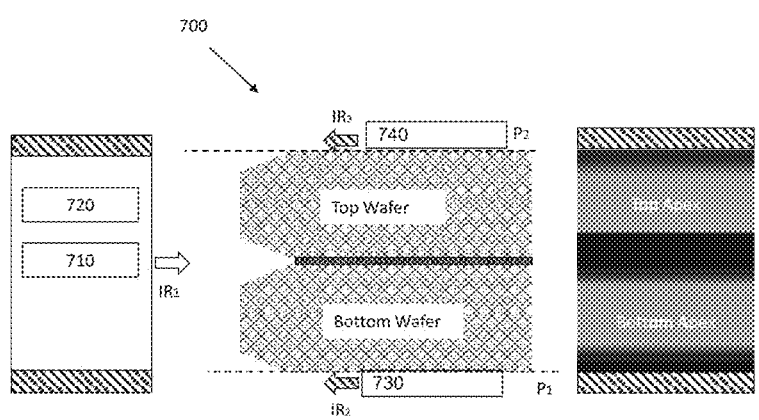
FIG. 8 shows a schematic cross-section of the main functional parts of an inspection system of the present disclosure inspecting a multi-tier stack according to some embodiments of the present disclosure.

Reference is made to FIG. 8 showing a schematic cross-section of the main functional parts of an inspection system 700 of the present disclosure inspecting a multi-tier stack. Semiconductor edge and bevel inspection tool system 700 comprises a first illumination setup 710 being capable of facing a wafer edge and being configured and operable to generate first illumination radiation $IR_1$ and to direct at least a portion of the first illumination radiation towards an edge and bevel region of the wafer; an imaging sensor unit 720 being configured and operable to collect light radiation and to generate sensing data, a second illumination setup 730 being configured to be capable of being placed facing of the imaging sensor unit 720 and being configured and operable to generate second illumination radiation $IR_2$ and to direct at least a portion of the second illumination radiation $IR_2$ in a direction substantially parallel to the bottom wafer plane $P_1$ of the bottom wafer, toward the imaging sensor unit 120, a third illumination setup 740 being configured to be capable of being placed facing of the imaging sensor unit 720 and being configured and operable to generate third illumination radiation $IR_3$ and to direct at least a portion of the second illumination radiation $IR_3$ in a direction substantially parallel to the top wafer plane $P_2$ of the top wafer, toward the imaging sensor unit 120. In this example, at least a portion of the light rays of the second and third illumination setup intersects the wafer bottom and top planes, saturating the bottom and the top portions of the imaging sensor unit 720. A clear sharp image of the wafer edges representing the wafer bottom and top planes is obtained.

Figure 9A:
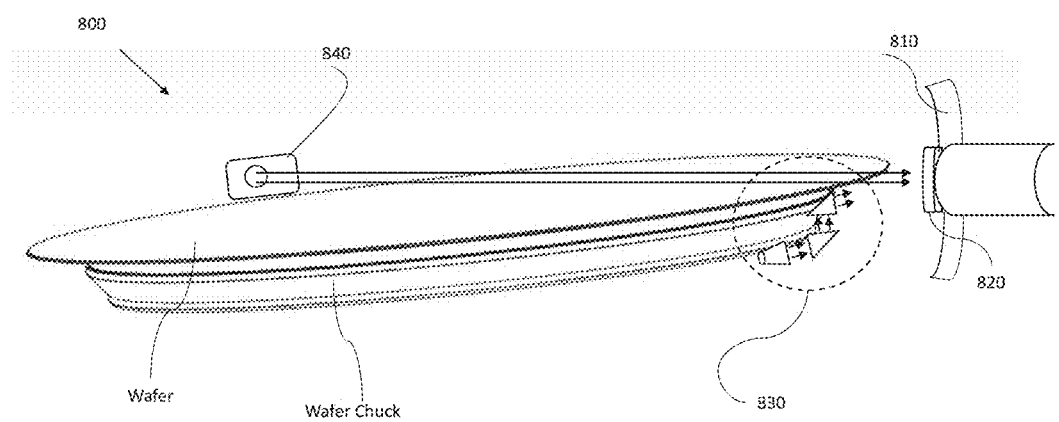
FIGS. 9A-9B show schematic side views of a possible configuration of the inspection system of a wafer placed on a wafer chuck according to some embodiments of the present disclosure.
Figure 9B:
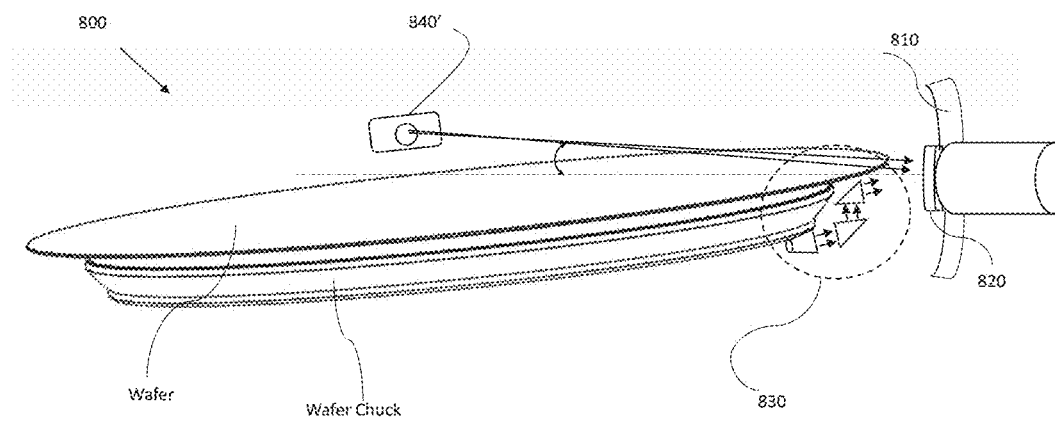

Reference is made to FIGS. 9A-9B showing a possible configuration of the inspection system 800 of a wafer placed on a wafer chuck according to some embodiments of the present disclosure. Inspection system 800 comprises a first illumination setup 810 facing a wafer edge and being configured and operable to generate first illumination radiation and to direct at least a portion of the first illumination radiation towards an edge and bevel region of the wafer, an imaging sensor unit 820 being configured and operable to collect light radiation and to generate sensing data, a second illumination setup 830 facing the imaging sensor unit 820 and being configured and operable to generate second illumination radiation and to direct at least a portion of the second illumination radiation in a direction substantially parallel to the wafer plane toward the imaging sensor 820 and a third illumination setup 840 being configured and operable to generate third illumination radiation and to direct at least a portion of the third illumination radiation in a direction substantially parallel to the wafer plane toward the imaging sensor 820, wherein at least a portion of the third illumination radiation is configured for interacting with at least a portion of the wafer edge and bevel region surface. In this configuration, third illumination setup 840 is configured as a remote light source being positioned at the opposite side of the wafer relatively to the first illumination setup 810 and imaging sensor unit 820. Third illumination setup 840 may be placed coaxially (i.e. substantially parallel) with the wafer top plane. Alternatively, third illumination setup 840' may be placed at a certain angle (e.g. less than 5°, 10°, 200 30°, 45°) with the wafer top plane as shown in FIG. 8B. To this end, third illumination setup 840' may be mounted on a Z stage to provide a flexible positioning. The flexible positioning may be required when, as mentioned above, the top wafer plane is not flat, (e.g. with warped wafers, substrates with structural features), and it is challenging to illuminate the intersection area of Zones 1&2 or 5&4 shown in FIG. 1.

Figure 10:
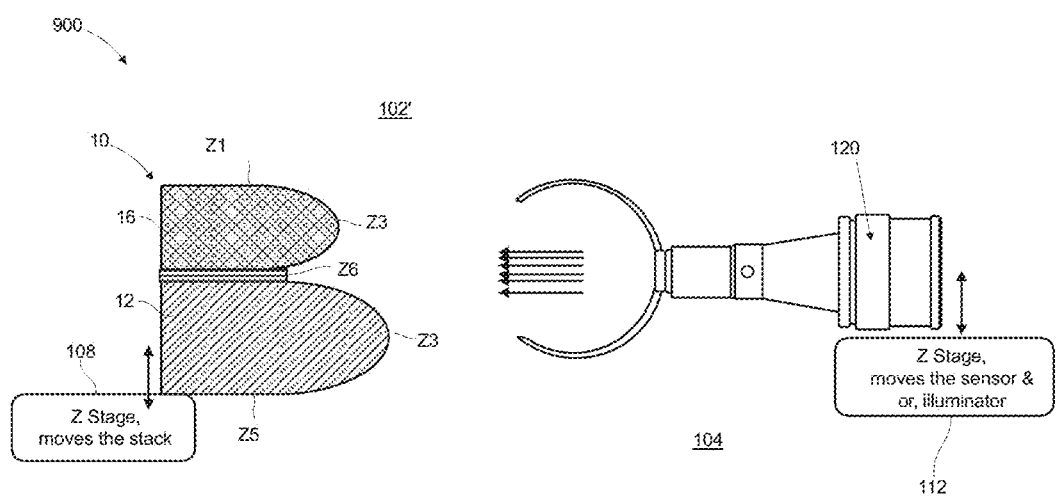
FIGS. 10-12 show partial views of possible configurations of the semiconductor inspection tool system according to some embodiments of the present disclosure.

Reference is made to FIG. 10 showing another possible configuration of a semiconductor inspection tool system 900 being integrated into a commercially available edge and bevels semiconductor inspection system according to some embodiments of the present disclosure. In this specific and non-limiting example, the edge and bevels inspection system includes inter alia (i) a second illumination setup 102' comprising an apex illumination module having a plurality of LEDs being arranged along an illumination arc, the apex illumination module being configured and operable to illuminate multi-tier stack 10, (ii) a first illumination setup 104 being configured and operable for providing focused illuminating radiation directed at the bonding layer (iii) an imaging sensor unit 120 and (iv) a first Z stage 108 being configured and operable to provide height changes to multi-tier stack 10 along the Z axis (assuming that multi-tier stack 10 is located in an imaginary XY plane).

In some embodiments, inspection tool system 900 may be associated with a second Z stage 112 being configured and operable to adjust (manually or automatically) the position of the light source and/or the bonding region sensor with respect to the bonding region along the Z axis.

In this specific and non-limiting example, multi-tier stack (e.g., stacked wafer) 10 includes a two-wafer stack i.e., a bottom carrier tier 12 having a thickness of about 1000 μm, a top wafer tier 16 having a thickness of about 800 μm and a bonding layer having a thickness of about 50 μm in between. Multi-tier stack 10, in which the diameter of the carrier is larger than the diameter of the wafer includes a plurality of zones Z1-Z5 corresponding to the multi-tier stack edge zones and a plurality of wafer edge zones as described above in FIG. 1. Including, from top to bottom, (i) wafer tier 16 including regions Z1, Z2 (not shown), Z3, and Z4 (not shown), (ii) the bonding layer including regions Z6; and (iii) carrier tier 12, including regions Z2 (not shown), Z3, Z4 (not shown), and Z5. The upward-facing surfaces are typically imaged by the top camera, for example, wafer tier 16, regions Z1 and Z2, and in some cases, regions carrier tier 12, Z2. Similarly, downwards-facing aspects are typically imaged by the bottom camera, for example, carrier tier 12, regions Z4 (not shown), and Z5.

First illumination setup 104 is configured and operable to generate at least one bonding region focused illumination radiation configured to illuminate the bonding region volume defined by regions Z3 and Z4 Wafer, Z6 Wafer-Carrier, and Z2 and Z3 Carrier.

Figure 11:
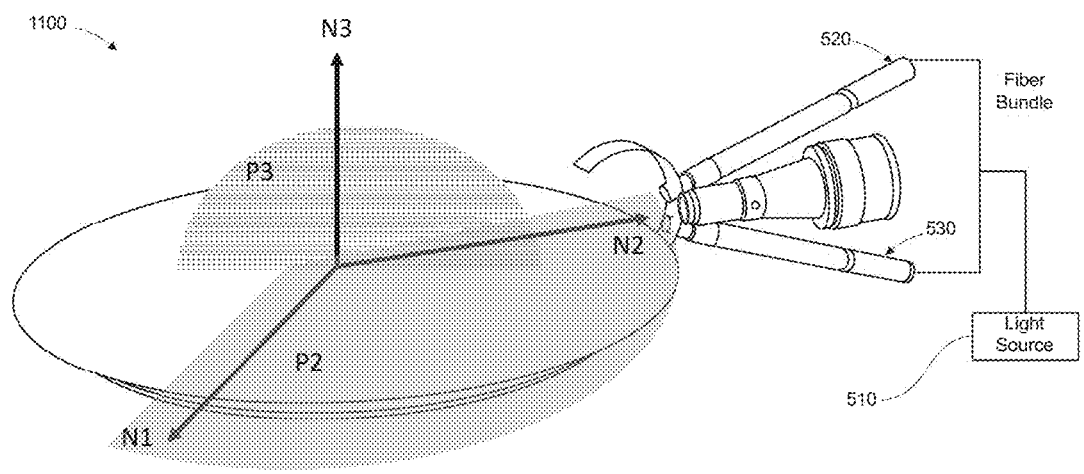

Reference is made to FIG. 11 showing a possible configuration of the inspection system 1100 of a wafer placed on a wafer chuck according to some embodiments of the present disclosure. The wafer plane P2 refers to a two-dimensional flat surface that extends infinitely in all directions. It is determined by the intersection of two perpendicular axes, N2 being the x-axis and N1 being the y-axis. N2 represents the horizontal direction, while N1 represents the vertical direction. In this embodiment, the imaging sensor unit is positioned at a normal direction N3 with the edge of the multi-tier stack of wafer. The normal direction N3 defines an axis being normal to the plane P2. A plane P3 intersecting plane P2 may be defined along N3.

In this example, the first illumination setup is arranged along an illumination arc may also include two guiding elements 520 and 530 (e.g. optical-fiber cables) forming for example an optical fiber bundle (i.e. an assembly containing one or more optical fibers configured to transmit light) and being connected to light source 510. Each guiding element is configured and operable to direct light radiation at a different edge and bevel region. The inspection of the plurality of the edge and bevel regions may be performed simultaneously by using inspection tool system 1100 or may be performed sequentially by using inspection tool system 900 and displacing (automatically or manually) guiding element 520 toward each bonding region sequentially. The guiding elements described above are operable to convey electromagnetic radiation.

Figure 12:
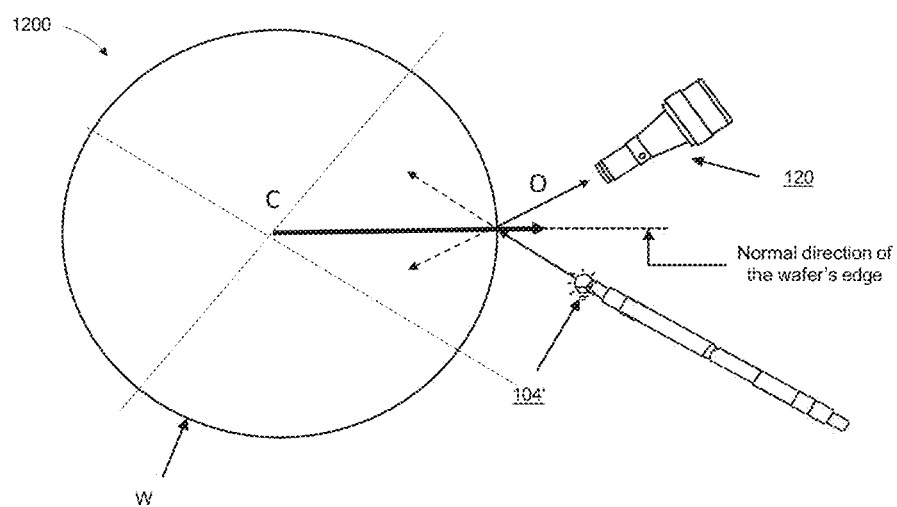

Reference is made to FIG. 12, showing specific and non-limiting examples in which bright field illumination is used. In the inspection tool system 1200 of FIG. 12, the illumination axis of the first illumination setup 104' is coaxial with the imaging region sensor's collection optical axis O to enable simultaneous illumination and collection of reflected electromagnetic radiation. In this example, the collection optical axis O and the first illumination axis do not intersect with the wafer center C. In this embodiment, imaging sensor unit 120 is positioned at a non-normal (i.e., angular) direction with the edge of the multi-tier stack of wafer W.

The invention claimed is:

1. A semiconductor edge and bevel inspection tool system of a wafer comprising:
 a first illumination setup being capable of facing a wafer edge and being configured and operable to generate a first illumination radiation along a first illumination axis and to direct at least a portion of the first illumination radiation towards an edge and bevel region of the wafer;
 an imaging sensor unit defining a collection optical axis being configured and operable to collect light radiation and to generate sensing data thereof;
 and a second illumination setup being configured to be capable of being placed facing said imaging sensor unit and being configured and operable to generate a second illumination radiation along a second illumination axis and to direct at least a portion of the second illumination radiation in a direction substantially parallel to the wafer plane toward said imaging sensor, wherein at least a portion of the second illumination radiation is configured for interacting with at least a portion of the edge and bevel region, wherein the first and the second illumination radiations have substantially opposite directions and wherein second illumination setup has different radiation parameters than the first illumination setup;
 wherein said imaging sensor unit is configured and operable to collect a second illumination radiation directed towards said imaging sensor unit by said second illumination setup, as well as a reflected illumination radiation reflected from the edge and bevel region, wherein the reflected illumination radiation is created by the first illumination setup; such that the sensing data is indicative of a boundary between the wafer plane and that of the edge and bevel region.

2. The inspection tool system of claim 1, wherein the different radiation parameters comprise (i) spectral properties including at least one of intensity, wavelength or angular coverage, (ii) illumination duration (iii) operation modes, or (iv) illumination beam shape and properties.

3. The inspection tool system of claim 1, wherein at least one of (i) the collection optical axis, (ii) the first illumination axis or (iii) or the second illumination axis do not intersect with the wafer center.

4. The inspection tool system of claim 1, wherein said first illumination setup is positioned in close proximity to said imaging sensor unit.

5. The inspection tool system of claim 1, wherein said first illumination setup has an arc-shaped configuration being capable of generating an omnidirectional illumination radiation around the wafer edge.

6. The inspection tool system of claim 1, wherein said first illumination setup comprises at least one light source defining a certain intensity.

7. The inspection tool system of claim 1, wherein said second illumination setup is positioned in close proximity to the wafer edge.

8. The inspection tool system of claim 1, wherein said second illumination setup is configured to be placed below the wafer plane.

9. The inspection tool system of claim 1, further comprising a fluorescent light source.

10. The inspection tool system of claim 1, further comprising a third illumination setup being configured to be capable of being placed facing said imaging sensor unit and being configured and operable to generate a third illumination radiation and to direct at least a portion of the third illumination radiation in a direction substantially parallel to the wafer plane toward said imaging sensor, wherein at least a portion of the third illumination radiation is configured for interacting with at least a portion of the edge and bevel region.

11. The inspection tool system of claim 10, wherein said first illumination setup has an intensity being higher than an intensity defined by either said second illumination setup or said third illumination setup.

12. The inspection tool system of claim 10, wherein, when said second illumination setup is positioned below the wafer plane, said third illumination setup is positioned above the wafer plane.

13. The inspection tool system of claim 10, wherein said second illumination setup is positioned at a first predefined distance from said imaging sensor unit and said third illumination setup is positioned at a second predefined distance from said imaging sensor unit, wherein said first predefined distance is smaller than said second predefined distance.

14. The inspection tool system of claim 13, wherein said second predefined distance is larger than a wafer diameter.

15. The inspection tool system of claim 13, wherein said second illumination setup or said third illumination setup includes a solid-state light (SSL) of any visible or near visible wavelength.

16. The inspection tool system of claim 10, wherein at least one of said second illumination setup or said third illumination setup is configured and operable to generate a substantially collimated illumination radiation.

17. The inspection tool system of claim 10, wherein at least one of said second illumination setup or said third illumination setup comprises an optical guiding unit being configured and operable to direct at least a portion of at least one of the second illumination radiation or the third illumination radiation toward said imaging sensor, such that at least a portion of said second illumination radiation or said third illumination radiation is configured for interacting with at least a portion of the edge and bevel region.

18. The inspection tool system of claim 17, wherein said optical guiding unit is configured and operable to direct at least a portion of at least one of the second illumination radiation or the third illumination radiation in a direction substantially parallel to the wafer plane.

19. The inspection tool system of claim 17, wherein said optical guiding unit is configured and operable to direct at least one of the second illumination radiation or the third illumination radiation at a certain non-zero angle relatively to the wafer plane.

20. The inspection tool system of claim 17, wherein said optical guiding unit comprises at least one prism element, a mirror or a light pipe.

21. The inspection tool system of claim 10, wherein at least one of said second illumination setup or said third illumination setup are configured and operable to detect edge defects.

22. The inspection tool system of claim 10, wherein at least one of said second illumination setup or said third illumination setup are configured and operable to detect wafer top surface defects.

23. The inspection tool system of claim 10, further comprising a control unit being configured and operable for controlling operation of at least one of said first illumination setup, said second illumination setup, said third illumination setup or said imaging sensor unit.

24. The inspection tool system of claim 23, wherein said control unit is configured and operable to operate at least partially at the same time at least two of said first, second, and third illumination setups.

25. The inspection tool system of claim 1, wherein said first illumination setup is capable of facing a multi-tier stack edge and is configured and operable to generate a first illumination radiation along a first illumination axis and to direct at least a portion of the first illumination radiation towards an edge and bevel region of the multi-tier stack; and said second illumination setup is configured and operable to generate a second illumination radiation along a second illumination axis and to direct at least a portion of the second illumination radiation in a direction substantially parallel to the multi-tier stack plane toward said imaging sensor, wherein at least a portion of the second illumination radiation is configured for interacting with at least a portion of the multi-tier edge and bevel region, wherein said imaging sensor unit is configured and operable to collect a second illumination radiation directed towards said imaging sensor unit by said second illumination setup, as well as a reflected illumination radiation reflected from the multi-tier edge and bevel region; such that the sensing data is indicative of a boundary between the multi-tier plane and that of the multi-tier edge and bevel region.

* * * * *